April 2, 1935.　　　S. M. BÄCKSTRÖM　　　1,996,094
ABSORPTION REFRIGERATING APPARATUS AND METHOD
Filed Feb. 10, 1931
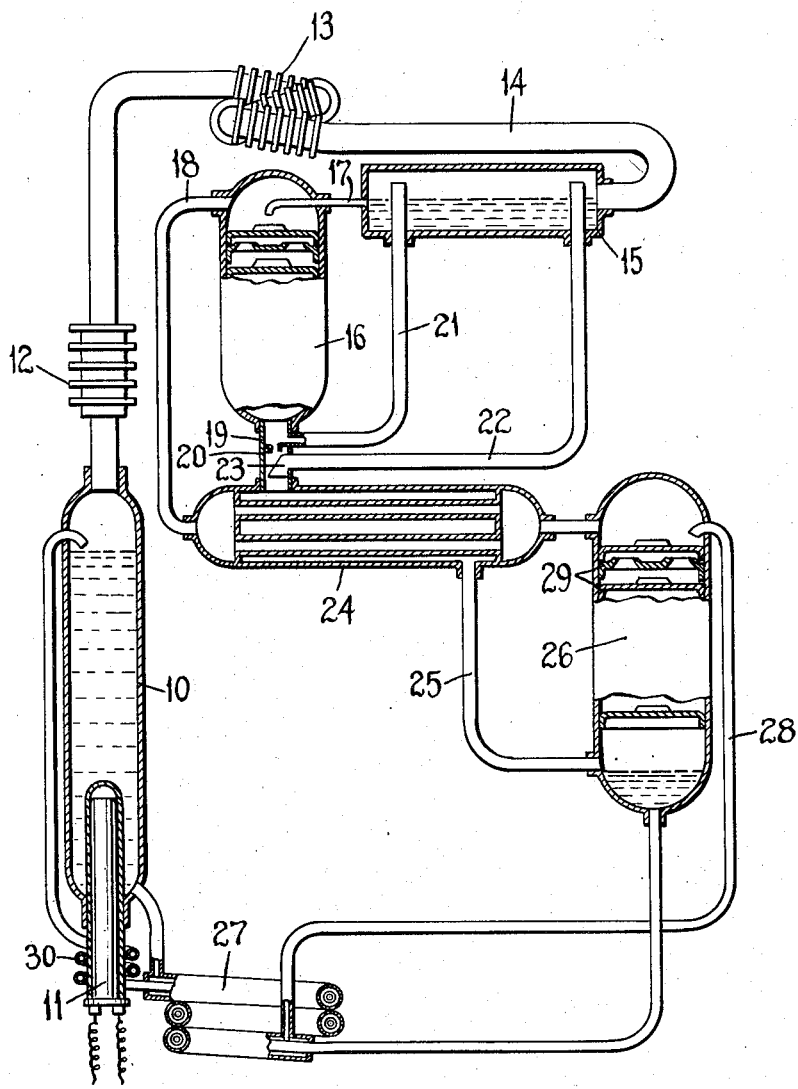
INVENTOR.
S. M. Bäckstrom
BY A. Yates Dowell
ATTORNEY Patented Apr. 2, 1935

1,996,094

UNITED STATES PATENT OFFICE 1,996,094

ABSORPTION REFRIGERATING APPARATUS AND METHOD

Sigurd Mattias Bäckström, Stockholm, Sweden, assignor, by mesne assignments, to Electrolux Servel Corporation, New York, N. Y., a corporation of Delaware Application February 10, 1931, Serial No. 514,753 In Germany July 25, 1930

20 Claims. (Cl. 62—119.5)

This invention relates to absorption refrigerating apparatus and more particularly to a continuous absorption refrigerating apparatus in which circulates a pressure equalizing medium.

An object of this invention is to improve a refrigerating system of this type by producing lower evaporator temperatures than heretofore have been possible. This improvement is obtained by allowing the circulating pressure equalizing medium which has been charged with refrigerant vapor in a space of evaporation to flow over the liquid refrigerant coming from the condenser before the latter enters said space of evaporation and advantageously in a space not in direct heat transfer relation with said space of evaporation.

Further objects and advantages will be apparent from the following description taken in connection with the accompanying drawing which is a diagrammatic view of a refrigerating system showing an arrangement contemplated by this invention.

A generator 10 contains a solution of refrigerant such as ammonia, in an absorption liquid such as water, and is adapted to be heated by some means such as an electric heating element 11. Ammonia vapor expelled from solution in the generator passes thru rectifier 12 into a condenser 13 in which the ammonia is condensed. Liquid ammonia from the condenser 13 passes through conduit 14 into a closed container 15 from where it overflows into the evaporator 16 through pipe 17. The liquid ammonia entering the evaporator 16 is dispersed into a pressure equalizing gas entering the evaporator through conduit 18, and vaporizes, absorbing heat from the surrounding medium.

The pressure equalizing gas enriched by ammonia vapor leaves the evaporator through conduit 19. A partition 20 in conduit 19, perforated to permit drainage of liquid, diverts the flow of the gas mixture so that it passes into conduit 21 which is connected to conduit 19 above the baffle plate 20. The gas mixture flows through conduit 21 into the vessel 15 above the liquid level therein and then through conduit 22 back into conduit 19 through a downwardly flaring nozzle 23 below the baffle plate 20. The gas mixture then flows through heat exchanger 24 and conduit 25 into the lower part of absorber 26.

Weak absorption liquid from the generator 10 passes through heat exchanger 27 and conduit 28 into the upper part of the absorber 26. Ammonia is removed from the gas mixture by absorption into the weak absorption liquid flowing down through the absorber 26 over the baffle plates 29 and the pressure equalizing gas returns to the evaporator 16 through the heat exchanger 24 and conduit 18. Enriched absorption liquid collects in the bottom of the absorber 26 from where it is returned to the generator 10 through heat exchanger 27 and heat pump 30.

In the arrangement just described a portion of the liquid ammonia in container 15 will vaporize into the gas mixture in the upper part of the container and thus cool the remaining liquid ammonia from a temperature near that of the cooling water or air around the condenser to a temperature approximating the temperature of evaporator 16. Thus the container 15 is in effect a second evaporator in which, due to evaporation into the rich pressure equalizing or inert gas, the liquid supplied from the condenser is cooled before entering the evaporator 16. The evaporators 15 and 16 are thermally separate and therefore may operate at different temperatures. With this arrangement less gas is circulated through the apparatus than is otherwise necessary and the liquid refrigerant enters the evaporator at a low temperature thus affording concentration of the refrigerating effect.

The present invention is particularly advantageous during normal operation of the type of apparatus to which it relates because it provides pre-cooling of the liquid entering the evaporator 18 at all heat inputs; whereas, in the prior art system such as shown in United States Patent 1,651,410, in which the conduit for supplying liquid refrigerant to the evaporator extends through the heat exchanger, no appreciable amount of liquid refrigerant reaches the heat exchanger at low heat imputs and consequently, at such times, the liquid refrigerant is cooled only by heat exchange with the gas mixture and not by evaporation of the liquid refrigerant.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. A refrigerating apparatus of the continuous absorption type in which circulates a pressure equalizing gas including a closed fluid container in the liquid refrigerant supply line from the condenser to the evaporator, a perforated baffle plate in the gas conduit between the evaporator and the absorber, and said apparatus including a path for fluid around said baffle plate and through said container.

2. A refrigerating apparatus of the continuous absorption type in which circulates a pressure equalizing gas including a generator, an absorber, a condenser, an evaporator, said parts being interconnected for flow of fluids therethrough, a fluid tight container connected to the liquid refrigerant line from the condenser, an overflow pipe from said container into the evaporator, and a gas circuit, including the portion of said container above the liquid level therein, between the evaporator and the absorber.

3. In a refrigerating system of the continuous absorption type in which circulates a pressure equalizing gas, the combination with a primary evaporator and a condenser, of a separate fluid contact heat exchanger interposed in the liquid refrigerant supply line between the condenser and the evaporator and the gas line from the evaporator to the absorber.

4. A refrigerating apparatus of the continuous absorption type in which circulates a pressure equalizing gas, including a fluid tight container connected to the liquid refrigerant line from the condenser, an overflow pipe from said container into the evaporator, a gas discharge line from the evaporator to the absorber, a baffle in said line, a conduit connected to said line on one side of said baffle and terminating within said container above the overflow pipe opening therein, and a second conduit connected to said line on the other side of said baffle and terminating within said container above the overflow pipe opening therein.

5. Refrigeration apparatus including, a generator and absorber interconnected for the circulation of absorption liquid therebetween, an evaporator interconnected with said absorber for the circulation of inert gas therebetween, a condenser connected to receive vapor from said generator and deliver condensate to said evaporator, and a fluid contact heat exchanger in the connections for condensate from said condenser to said evaporator and gas from said evaporator to said absorber.

6. Refrigeration apparatus including, an evaporator in heat exchange relation with a space to be refrigerated, an absorber means to interconnect said evaporator and absorber for the circulation of gas therebetween, means for supplying liquid refrigerant to said evaporator including an externally cooled condenser, and means for conducting gas in its path of flow from said evaporator to said absorber in contact with the liquid refrigerant before entrance of the latter into said evaporator.

7. The method of refrigeration which includes flowing an inert gas first through an evaporator and then through a precooling vessel, and flowing liquid refrigerant first through said precooling vessel in contact with and counterflow to the gas and then through said evaporator in the same direction as the gas.

8. In a method of producing refrigeration with an absorption system in which a pressure equalizing gas circulates, the steps which comprise condensing refrigerant due to an external cooling source and conducting gas from a space of evaporation in contact with such condensed refrigerant before entrance of the latter into said space of evaporation to effect an intermediate evaporation temperature between the temperature of the external cooling source and the temperature of said space.

9. In a method of producing refrigeration with an absorption system in which a pressure equalizing gas circulates, the steps which comprise condensing refrigerant due to an external cooling source and conducting gas from a space of evaporation to a space of absorption in contact with and counter-flow to condensed liquid refrigerant before entrance of the latter into said space of evaporation to effect an intermediate evaporation temperature between the temperature of the external cooling source and the temperature of said space.

10. A refrigerating apparatus of the continuous absorption type in which a pressure equalizing gas circulates including, a condenser, an evaporator in heat exchange relation with a body to be refrigerated, a liquid refrigerant supply line from said condenser to said evaporator, a closed fluid container in said supply line adapted to have a lower temperature than said condenser, and means for circulating gas from said evaporator through said container in direct contact with liquid therein.

11. In a method of producing refrigeration with an absorption system in which a pressure equalizing gas circulates, the step which comprises conducting gas from a space of evaporation in contact with condensed refrigerant liquefied by an external cooling source before entrance of the latter into said space of evaporation and immediately prior to the removal of the gas from the presence of condensed refrigerant to the place of absorption, said contact taking place in a space thermally separate from said space of evaporation.

12. In a method of producing refrigeration with an absorption system in which a pressure equalizing gas circulates, the step which comprises conducting gas from a space of evaporation to a space of absorption in contact with and counter-flow to condensed liquid refrigerant liquefied by an external cooling source before entrance of the latter into said space of evaporation and immediately prior to removal of the gas from the presence of the condensed refrigerant to the space of absorption, said contact taking place in a space thermally separate from said space of evaporation.

13. In a refrigerating system containing a refrigerant and an auxiliary gaseous fluid into which the refrigerant evaporates, a generator, a condenser, an absorber, means to circulate absorption liquid between the generator and the absorber, means to conduct vaporous refrigerant from the generator to the condenser to be liquefied, a first member in which evaporation of refrigerant takes place, a second member in which evaporation of refrigerant takes place, means to conduct liquid refrigerant from said condenser into said second member, means to conduct the liquid refrigerant from said second member to said first member, means to conduct the auxiliary fluid from the absorber to the first member and from said first member to said second member, means to withdraw the auxiliary fluid from the second member adjacent to the place of introduction of liquid refrigerant thereinto and means to conduct the auxiliary fluid back to the absorber.

14. In a refrigerating system containing a refrigerant and an auxiliary gaseous fluid into which the refrigerant evaporates, a generator, a condenser, an absorber, means to circulate absorption liquid between the generator and the absorber, means to conduct vaporous refrigerant from the generator to the condenser to be liquefied, a first member in which evaporation of refrigerant takes place, a second member in which evaporation of refrigerant takes place, said members being thermally separate, means to conduct liquid refrigerant from said condenser to said second member and from said second member downwardly to said first member without passing back to said second member, and means to conduct the auxiliary fluid from the absorber to the first member and from said first member to said second member and thence away from the presence of liquid refrigerant back to the absorber.

15. In a refrigerating system containing a refrigerant and an auxiliary gaseous fluid into which the refrigerant evaporates, a generator, a condenser, an absorber, means to circulate absorption liquid between the generator and the absorber, means to conduct vaporous refrigerant from the generator to the condenser to be liquefied, a first member in which evaporation of refrigerant takes place, a second horizontal member in which evaporation of refrigerant takes place, said members being thermally separate, means to conduct liquid refrigerant from said condenser to said second member and from said second member downwardly to said first member, and means to conduct the auxiliary fluid from the absorber to the first member and from said first member upwardly to said second member and in counter-flow with liquid in said second member and thence back to the absorber.

16. In an absorption refrigerating system employing refrigerant fluid and an auxiliary gaseous fluid into which the refrigerant evaporates, the improvement which consists in condensing refrigerant, flowing the condensed refrigerant horizontally, passing cooled auxiliary fluid enriched with refrigerant vapor horizontally over the surface of the horizontally flowing liquid to cool the liquid by evaporation, thence flowing the liquid refrigerant downwardly into contact with auxiliary fluid less rich with refrigerant vapor in heat exchange relation with a body to be cooled to low temperature and thereby producing enriched auxiliary fluid, and utilizing the auxiliary fluid thus enriched to produce the first-mentioned evaporation of the horizontally flowing liquid.

17. In an absorption refrigerating system employing refrigerant fluid and an auxiliary gaseous fluid into which the refrigerant evaporates, the improvement which consists in condensing refrigerant, flowing the condensed refrigerant horizontally, passing cooled auxiliary fluid enriched with refrigerant vapor horizontally over the surface of the horizontally flowing liquid in counter-current thereto to cool the liquid by evaporation, thence flowing the liquid refrigerant downwardly into contact with auxiliary fluid less rich with refrigerant vapor in heat exchange relation with a body to be cooled to low temperature and thereby producing enriched auxiliary fluid, utilizing the auxiliary fluid thus enriched to produce the first-mentioned evaporation of the horizontally flowing liquid, and preventing heat transfer between the horizontally flowing liquid and the liquid in the presence of the less rich auxiliary fluid.

18. In an absorption refrigerating system employing refrigerant fluid and an auxiliary gaseous fluid into which the refrigerant evaporates, the improvement which consists in condensing refrigerant, flowing the condensed refrigerant in a first path, passing cooled auxiliary fluid enriched with refrigerant vapor over the surface of the liquid in said first path to cool the liquid by evaporation, thence flowing the liquid refrigerant downwardly in a second path into contact with auxiliary fluid less rich with refrigerant vapor in heat exchange relation with a body to be cooled to low temperature and thereby producing enriched auxiliary fluid, utilizing the auxiliary fluid thus enriched to produce the first-mentioned evaporation of the horizontally flowing liquid, and preventing heat transfer between liquid in the two paths.

19. In a refrigerating system containing a refrigerant and an auxiliary gaseous fluid into which the refrigerant evaporates, a generator, a condenser, an absorber, means to circulate absorption liquid between the generator and the absorber, means to conduct vaporous refrigerant from the generator to the condenser to be liquefied, a first member in which evaporation of refrigerant takes place, a second member in which evaporation of refrigerant takes place, said second member being disposed at a generally higher level than said first member and being generally horizontally disposed and having a substantial horizontal extent for flow of liquid, means to conduct liquid refrigerant from said condenser to said second member and from said second member downwardly to said first member, and means to conduct the auxiliary fluid from the absorber to the first member and from said first member upwardly to said second member and in countercurrent with the liquid in the second member over the entire extent of the horizontal path of flow and thence back to the absorber.

20. In a refrigerating system, an absorber, a low temperature evaporator, a separate pre-cooling evaporator, said absorber being disposed generally below said low temperature evaporator, said pre-cooling evaporator being disposed generally above said low temperature evaporator, said low temperature evaporator having an appreciable vertical extent, said pre-cooling evaporator being substantially horizontal, means to conduct liquid refrigerant into said pre-cooling evaporator and thence to said low temperature evaporator, and means to circulate gaseous fluid from the absorber through the low temperature evaporator, through the pre-cooling evaporator, and back to the absorber.

SIGURD MATTIAS BÄCKSTRÖM.